United States Patent [19]

Utsunomiya et al.

[11] 4,357,631
[45] Nov. 2, 1982

[54] GHOST CANCELLING SYSTEM

[75] Inventors: Kimitake Utsunomiya, Sagamihara; Hisafumi Yamada, Tohshin; Choei Kuriki, Urawa, all of Japan

[73] Assignee: Sony Corporation, Tokyo, Japan

[21] Appl. No.: 248,199

[22] Filed: Mar. 27, 1981

[30] Foreign Application Priority Data

Mar. 31, 1980 [JP] Japan .................... 55-41329

[51] Int. Cl.³ .............................................. H04N 5/21
[52] U.S. Cl. .................................... 358/167; 358/905
[58] Field of Search ............................ 358/167, 905

[56] References Cited

U.S. PATENT DOCUMENTS 3,956,585  5/1976  Butler et al. .................. 358/905
4,044,381  8/1977  Shimano et al. ............... 358/905

*Primary Examiner*—Richard Murray
*Attorney, Agent, or Firm*—Hill, Van Santen, Steadman, Chiara & Simpson

[57] ABSTRACT

A ghost cancelling system is disclosed which includes an input terminal applied with a video signal including a ghost signal component, a ghost cancelling circuit connected to the input terminal, the ghost cancelling circuit including a transversal filter, and an output terminal connected to the ghost cancelling circuit for deriving an output video signal in which the ghost signal component is substantially suppressed. In this case, the transversal filter comprises the combination of a common delay circuit used for a signal delay circuit and for a demultiplexer circuit in time divisional manner, a memory circuit connected to the common delay circuit and activated when the common delay circuit is used for the demultiplexer circuit, and a weighting circuit connected between the memory circuit and the common delay circuit.

6 Claims, 15 Drawing Figures

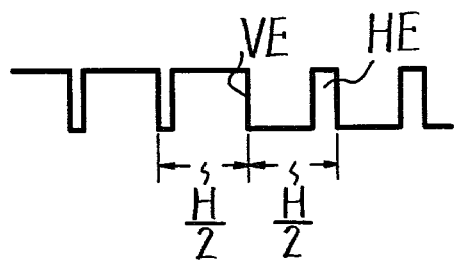
FIG. 2
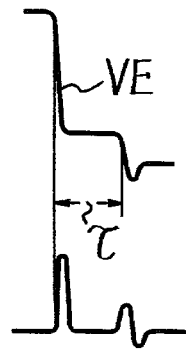
FIG. 3A
FIG. 3B
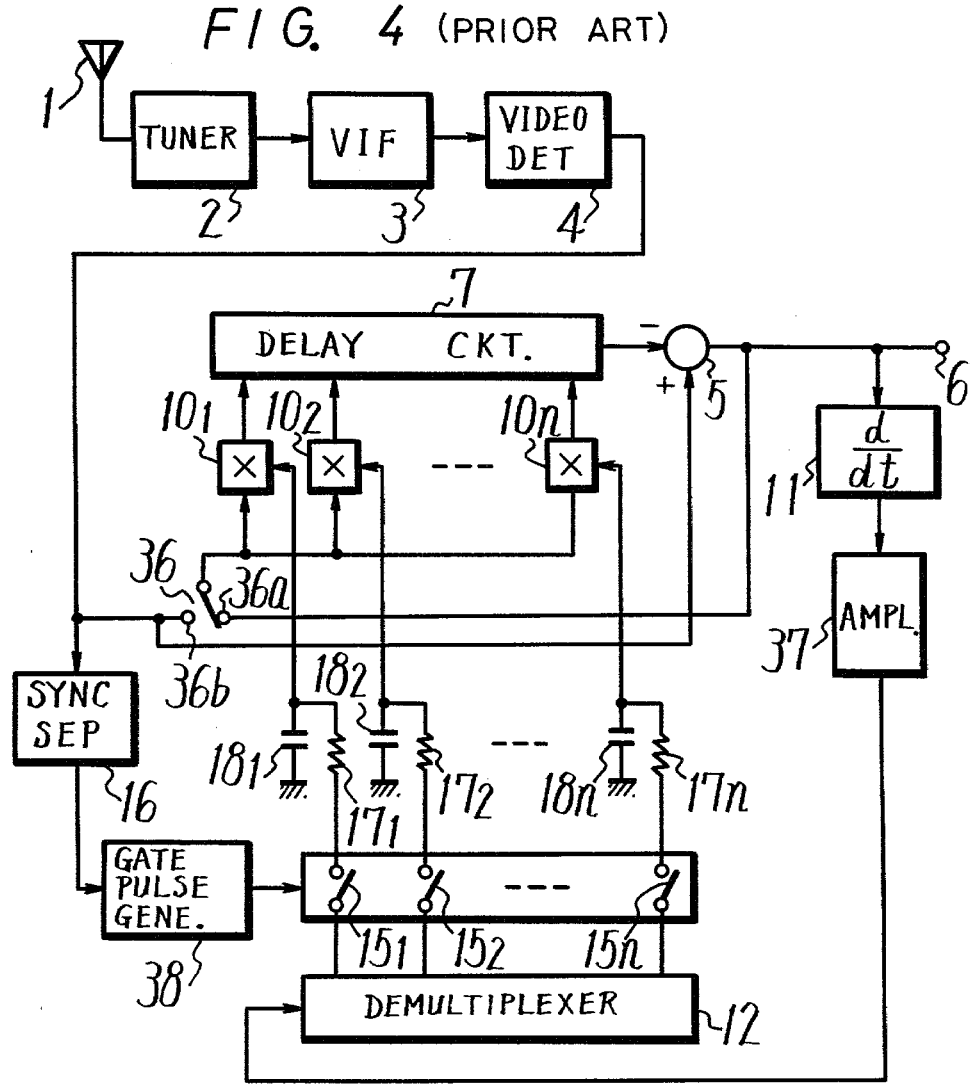
FIG. 4 (PRIOR ART)

FIG. 6B (P₁) 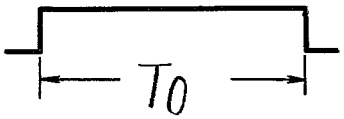
FIG. 6C (P₂) 
FIG. 12
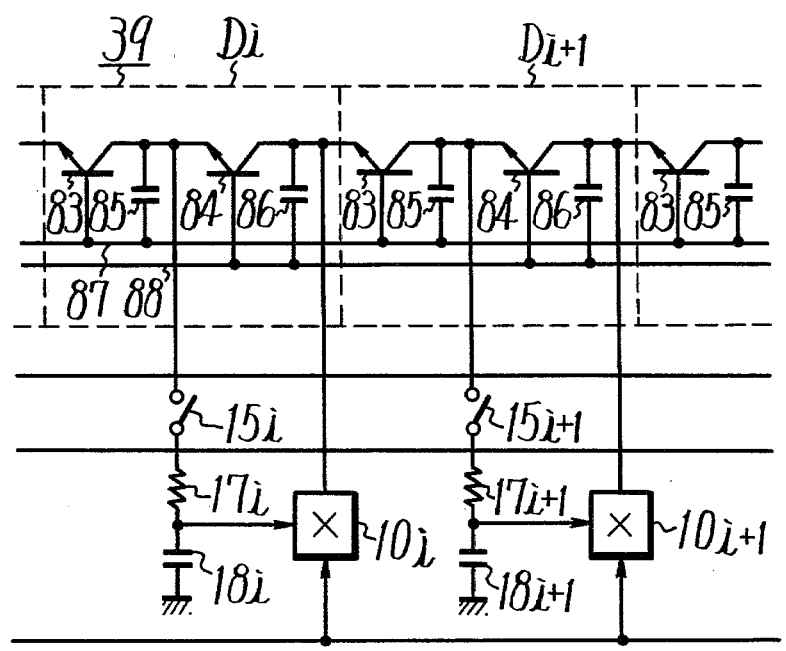

GHOST CANCELLING SYSTEM

BACKGROUND OF THE INVENTION

1. Field of the Invention

The present invention relates generally to a ghost cancelling system, and is directed more particularly to a ghost cancelling system by which a ghost signal is eliminated at the video signal stage.

2. Description of the Prior Art

In the art, there is known such a system which eliminates a ghost signal at the video stage as shown in FIG. 1. In the prior art system shown in FIG. 1, the signal received by an antenna 1 is fed through a tuner 2 and a VIF (video intermediate frequency) amplifier 3 to a video detector circuit 4 wherein the video signal is detected. The video signal therefrom is fed to a subtraction type adder 5 which is also supplied with the ghost cancelling signal which is formed by imitating the input ghost signal from a transversal filter as will be described later. Thus, the video signal from which the ghost signal is eliminated is derived from the adder 5 and then delivered to an output terminal 6.

The video signal delivered from the adder 5 is fed through a contact 36a of a mode selection switch 36 to a delay circuit 7 which forms a part of a transversal filter. This delay circuit 7 is formed of a plurality of delay units, each of which has a delay time corresponding to a signal sampling period (for example, 100 nanoseconds), connected at a plurality of stages, and n's taps are respectively led out from the respective stages. The respective outputs from the taps are fed to weighting function circuits $10_1$, $10_2$, $-10_n$ of the multiplier type.

The video signal from the adder 5 is fed also to a differentiation circuit 11 by which the ghost level is detected. In this case, the level detecting period of the ghost is selected to be such a period which is contained in the standard television signal and is not affected by the video signal as long as possible, for example, the period of the vertical synchronizing signal is generally used as the above ghost detecting period. In general, as shown in FIG. 2, the period of H/2 from a front edge VE of a vertical synchronizing signal to an equalizing pulse HE is selected as the detecting period. The signal level during the detecting period is differentiated and the tapped outputs of the delay units are weighted in proportion to the differentiated level.

For example, in such a case where a ghost signal with a phase difference $\phi(\phi = \omega_c \tau$, $\omega_c$ is an angular frequency of a video carrier at a high frequency stage) from the video signal of 45° and a delay time $\tau$ at the RF stage of 45° is contained, there appears such a video signal with the waveform shown in FIG. 3A in the ghost detecting period. This signal is differentiated and inverted in its polarity. Then, a signal with the differentiated waveform shown in FIG. 3B is obtained. This differentiated waveform can be approximately regarded as the impulse response of the ghost signal.

The differentiated waveform, which corresponds to the ghost level detecting signal, delivered from the differentiation circuit 11 is supplied through an amplifier 37 to a demultiplexer 12. This demultiplexer 12 is formed of a plurality of delay units, each of which has the delay time corresponding to the signal sampling period, connected at a plurality of stages, and n's taps are led out from the respective stages similar to the delay circuit 7. The respective tapped outputs are fed to switching circuits $15_1$, $15_2$, $-15_n$, respectively.

The video signal from the video detector circuit 4 is also fed to a sync. separator circuit 16 which supplies its output to a gate pulse generator 38. This gate pulse generator 38 produces gate pulses, each of which corresponds to the period of H/2 from the front edge VE of the vertical synchronizing signal, and supplies the same to the switching circuits $15_1$ to $15_n$ to render them ON.

The signals from the switching circuits $15_1$ to $15_n$ are respectively fed to analog accumulative adders respectively consisting of resistors $17_1$, $17_2$, $-17_n$ and capacitors $18_1$, $18_2$, $-18_n$. The signals from the capacitors $18_1$ to $18_n$ are fed to the weighting function circuits $10_1$ to $10_n$, respectively. The outputs from the weighting circuits $10_1$ to $10_n$ are fed to an adder circuit 20 and then added therein to produce a ghost cancelling signal which is then fed to the subtraction type adder 5.

The above delay circuit 7, weighting circuits $10_1$ to $10_n$ and adder circuit 20 form a so-called transversal filter. This transversal filter is inserted into the feedback loop, so that a so-called inverse filter is formed and hence the ghost signal component contained in the input video signal can be eliminated. In this case, the distortion of a waveform within a H/2 period from the front edge of a certain vertical synchronizing signal is detected and the weighting functions are determined. Thereafter, if the ghost signal component still remains uncancelled in the output video signal, the distortion is, further detected by the differentiation circuit 11 to reduce the ghost component which remain uncancelled in the output video signal and the accumulative adder operates therefor.

When the mode selection switch 36 is changed over to its terminal 36b, the ghost cancelling circuit is changed over to the feed-forward mode from the feedback mode. Even in the feed-forward mode, the ghost cancelling operation similar to that described as above is carried out.

FIG. 4 shows another type of the prior art ghost cancelling system. In the example of FIG. 1, there is employed the transversal filter of the output adding type in which the tapped outputs from the delay circuit 7 are weighted and then added at the adder circuit 20 to produce the ghost cancelling signal. While, in the example of FIG. 4, such a transversal filter of the input adding type is employed in which input signals which are weighted are respectively fed to the taps of the delay circuit 7. The ghost cancelling operation of the example shown in FIG. 4 is entirely same as that of FIG. 1.

In either of the prior art examples shown in FIGS. 1 and 4, individually independent two delay circuits such as the demultiplexer 12 for sampling the waveform of the input video signal in the ghost detecting period and generating the weighting signal necessary to imitate the ghost component and the delay circuit 7 for generating the ghost cancelling signal are necessary. Therefore, the prior art systems become bulky and complicated in construction. Further, when the delay characteristics of both delay circuits 7 and 12 are not equal, the ghost cancelling operation becomes incomplete. Further, when the entire ghost cancelling circuits are made an IC, since the number of external terminals to led out is many and so on, the respective delay circuits occupy a large area of a semiconductor wafer. As a result, it is difficult to provide two delay circuits as an IC of one tip, or that is, it is necessary to divide the IC as two tips.

OBJECTS AND SUMMARY OF THE INVENTION

Accordingly, an object of the present invention is to provide a novel ghost cancelling system free from the defects inherent to the prior art.

According to the present invention, based upon the fact that, in the case of the ghost cancelling system utilizing the transversal filter of the input adding type, the direction for transferring the detected ghost level signal in the delay circuit becomes same as that in the demultiplexer, the functions of both delay circuits are carried out by one delay circuit.

According to an aspect of the present invention, there is provided a ghost cancelling system which comprises:
an input terminal applied with a video signal including a ghost signal component,
a ghost cancelling circuit connected to said input terminal, said ghost cancelling circuit including a transversal filter; and
an output terminal connected to said ghost cancelling circuit for deriving an output video signal in which said ghost signal component is substantially suppressed, characterized in that said transversal filter comprises a combination of:
(1) a common delay circuit used for a signal delay circuit and for a demultiplexer circuit in time divisional manner,
(2) a memory circuit connected to said common delay circuit and activated when said common delay circuit is used for said demultiplexer circuit, and
(3) a weighting circuit connected between said memory circuit and said common delay circuit.

The additional, and other objects, features and advantages of the present invention will become apparent from the following description taken in conjunction with the accompanying drawings through which the like references designate the same elements and parts.

BRIEF DESCRIPTION OF THE DRAWINGS

FIGS. 2 and 3A and B are respectively waveform diagrams used to explain the operation of the ghost cancelling system shown in FIG. 1;

FIG. 4 is a block diagram showing another example of the prior art in which a transversal filter of an input adding type is used;

FIGS. 6A, 6B and 6C are respectively waveform diagrams used to explain the operation of the example shown in FIG. 5;

FIG. 12 is a connection diagram showing another example of the delay circuit which can be also used in the invention.

DESCRIPTION OF THE PREFERRED EMBODIMENTS

Figure 1:
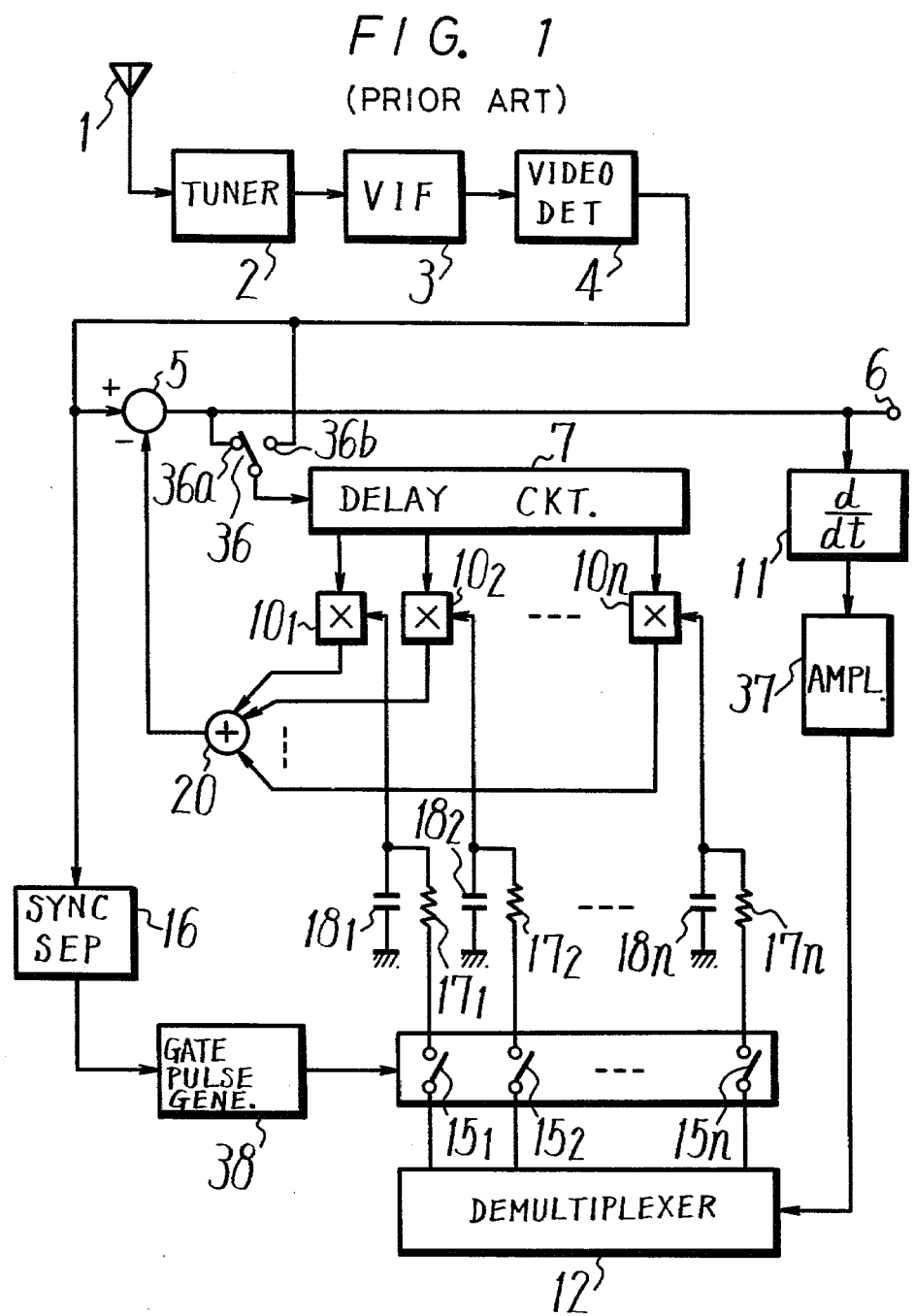
FIG. 1 is a block diagram showing an example of the prior art ghost cancelling system in which a transversal filter of an output adding type is used.

An example of the ghost cancelling system according to the present invention will be hereinafter described with reference to FIG. 5 in which the references same as those used in FIGS. 1 and 4 designate the same elements and parts.

Figure 5:
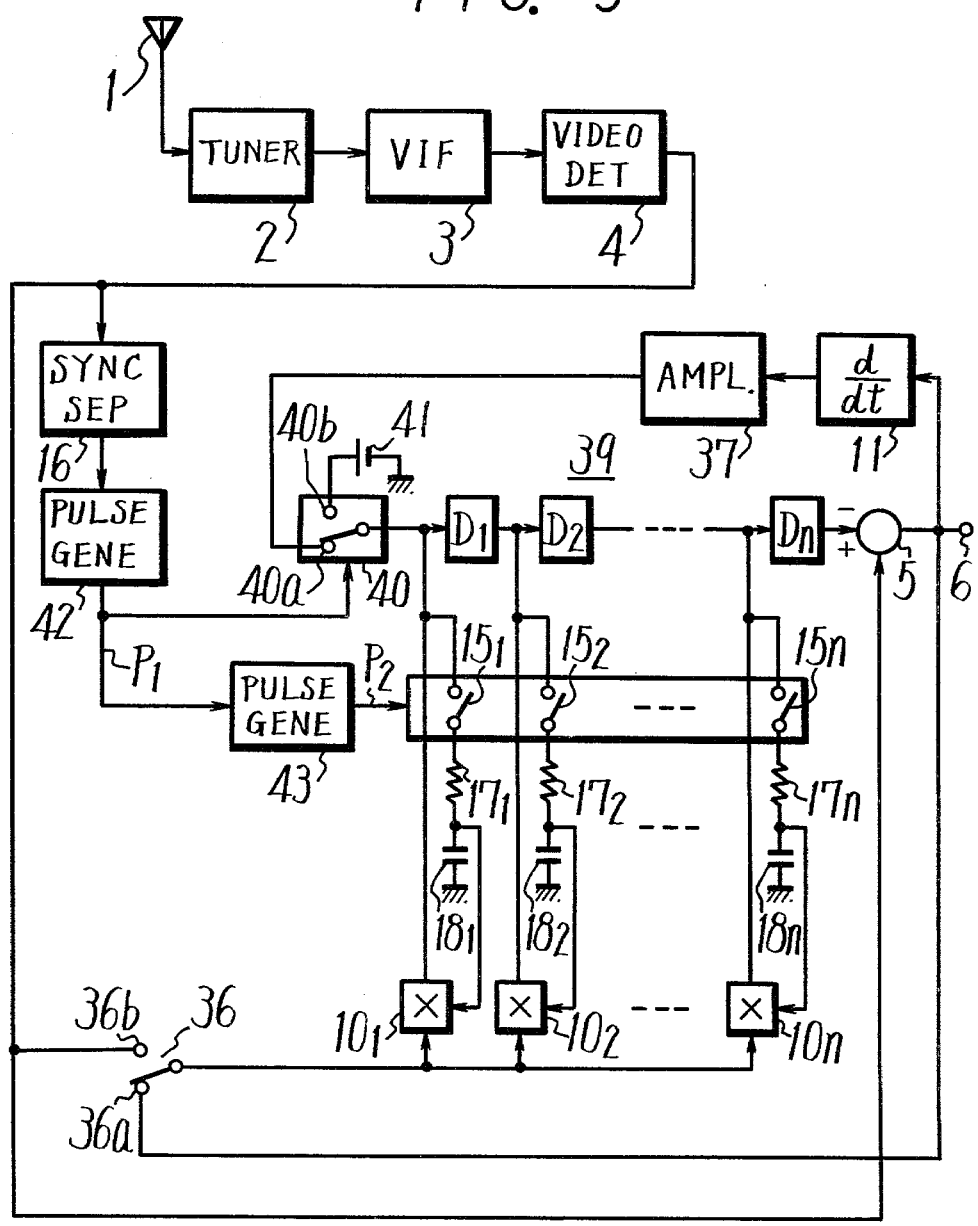
FIG. 5 is a block diagram showing an example of the ghost cancelling system according to the present invention.

In FIG. 5, 39 generally denotes a delay circuit which consists of n's delay units $D_1$ to $D_n$, each of which has the delay time equal to the signal sampling period of, for example, 100 ns (nano-seconds), connected in cascade. The outputs from the weighting circuits $10_1$ to $10_n$ are respectively supplied to the delay units $D_1$ to $D_n$ of the delay circuit 39, and the outputs at the respective stages of the delay units $D_1$ to $D_n$ are fed through the switching circuits $15_1$ to $15_n$ and resistors $17_1$ to $17_n$ to the capacitors $18_1$ to $18_n$ which memorize the weighting functions, respectively. A switch 40 is provided at the input side of the delay unit $D_1$ at the first stage of the delay circuit 39, and the subtraction type adder 5 is provided at the output side of the delay unit $D_n$ at the last stage of the delay circuit 39. The video signal, from which the ghost component is eliminated, is derived from the adder 5 and fed to the output terminal 6. This video signal is fed through the differentiation circuit 11 and the amplifier 37 to one input terminal 40a of the switch 40 whose other input terminal 40b is connected to a fixed bias voltage source 41. A pulse generator 42 is provided which is supplied with the output from the sync. separator circuit 16 and generates a control pulse $P_1$ and supplies the same to the switch 40. When the control pulse $P_1$ is in a high level, the input terminal 40a is selected, while when the control pulse $P_1$ is in a low level, the input terminal 40b is selected.

Figure 6A:
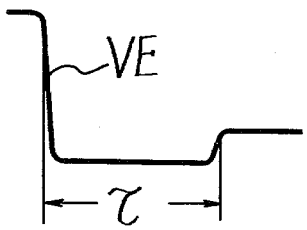

For example, when a ghost signal with the delay time $\tau$ and 180° out of phase ($\phi=180°$) shown in FIG. 6A is contained in the input video signal, the pulse generator 42 generates a pulse $P_1$ which becomes the high level during the ghost detecting $T_0$ after the front edge VE of the vertical synchronizing signal as shown in FIG. 6B. The ghost detecting period $T_0$ is $\frac{1}{2}H$ from the front edge VE at longest. The control pulse $P_1$ is also supplied to a gate pulse generator 43 which then produces a gate pulse $P_2$ which becomes high level in a very short period immediately after the ghost detecting period $T_0$ as shown in FIG. 6C. This gate pulse $P_2$ is fed to the switching circuits $15_1$ to $15_n$ to render them ON in only the high level period of the gate pulse $P_2$.

The video signal appearing at the output terminal 6 is supplied through the mode selection switch 36 to the respective weighting circuits $10_1$ to $10_n$. Upon the feedforward mode, the video signal from the video detector circuit 4 is fed to the weighting circuits $10_1$ to $10_n$ through the mode selection switch 36.

When the control pulse $P_1$ is in high level in the ghost detecting period $T_0$, the input terminal 40a of the switch 40 is selected as shown in FIG. 5. Accordingly, the waveform in the ghost detecting period $T_0$ passes through the weighting circuits $10_1$ to $10_n$ and delay units $D_1$ to $D_n$, thereafter is differentiated, amplified and then fed through the switch 40 to the delay circuit 39 at its first stage. At the time when the ghost detecting period $T_0$ terminates, outputs which are provided by sampling the ghost detecting signal are produced from the respective delay units $D_1$ to $D_n$. The switching circuits $15_1$ to $15_n$ are respectively made ON by the gate pulse $P_2$, and the tapped outputs from the delay units $D_1$ to $D_n$ of the delay circuit 39 are respectively memorized in the capacitors $18_1$ to $18_n$.

In the period other than the ghost detecting period $T_0$, the switch 40 is so changed that its input terminal 40b is selected. Thus, the weighting signals memorized in the capacitors $18_1$ to $18_n$ and the video signal are respectively fed to the weighting circuits $10_1$ to $10_n$ the outputs from which are respectively fed to the delay units $D_1$ to $D_n$ of the delay circuit 39. Thus, the ghost cancelling signal is provided thereby and fed to the adder 5 at which the ghost component is eliminated from the input video signal.

In the example of the invention shown in FIG. 5, the bias voltage source 41 supplies the necessary operation voltage to the delay circuit 39 when it is made on the semiconductor wafer as an IC.

As will be understood from the above description on the example of the invention, according to the present invention, the demultiplexer function to generate the weighting signal from the ghost level detected signal and the delay function to generate the ghost cancelling signal are both carried out by using a single common delay circuit 39 in time divisional manner. Therefore, as compared with the prior art in which indivisionally independent two delay circuits are used, the invention is simple in construction and suitable when it is made an IC. Further, since the invention uses only a single delay circuit, the invention can eliminate the deterioration of the ghost cancelling operation which is caused by the non-uniformity in the characteristics between two delay circuits as in the prior art system.

Figure 7:
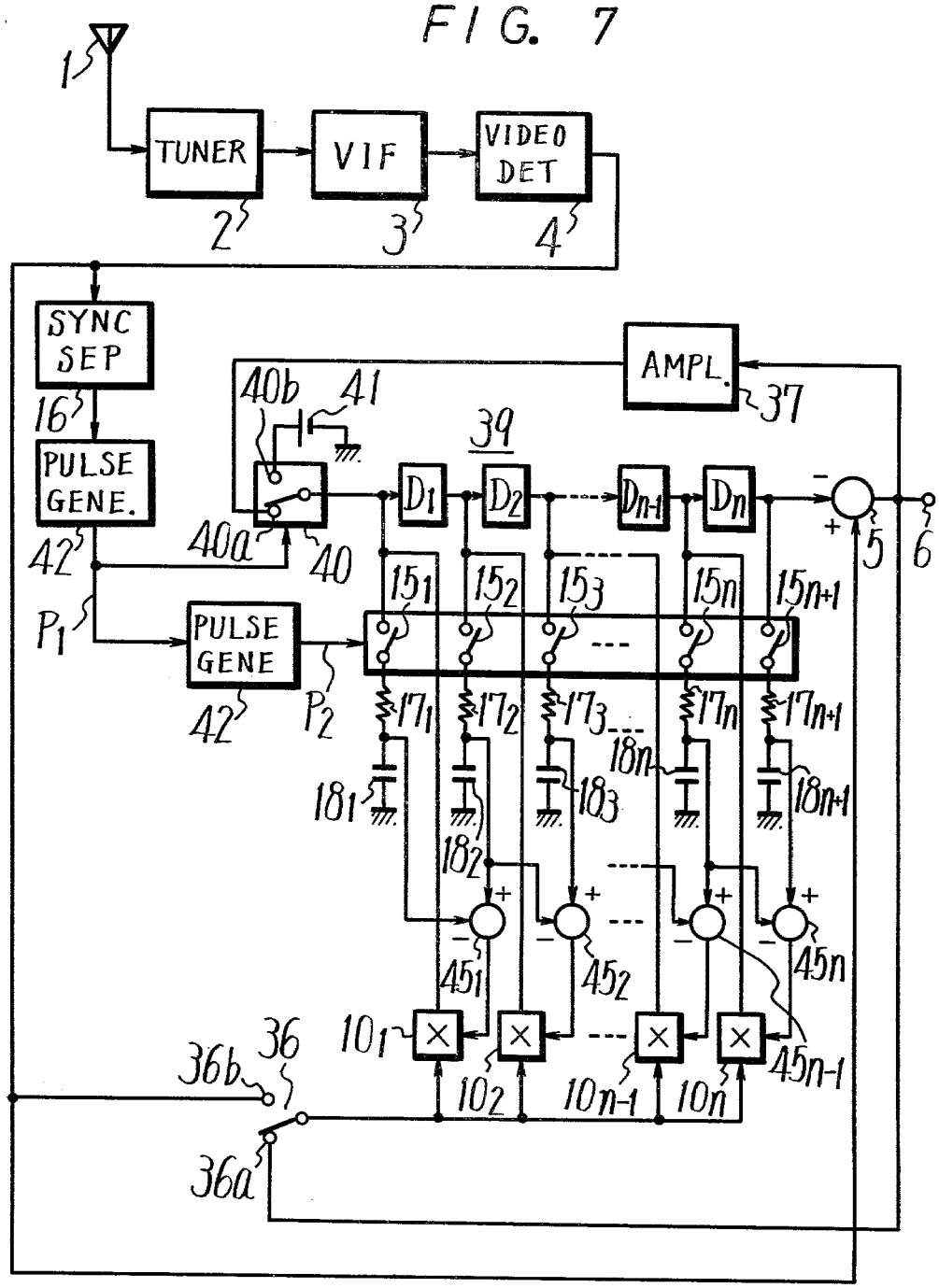
FIG. 7 is a block diagram showing another example of the invention.

Turning to FIG. 7, another example of the invention will be described in which, as will be described now, in order to detect the ghost level, a difference circuit is employed in place of the differentiation circuit 11 used in the example of FIG. 5. As the delay means for the difference circuit, the delay units of the delay circuit 39 are used. To this end, as shown in FIG. 7, at the output side of the delay unit $D_n$ at the last stage in n's delay units $D_1$ to $D_n$, there are provided a switching circuit $15_{n+1}$, a resistor $17_{n+1}$ and a capacitor $18_{n+1}$. The signals memorized in the capacitors $18_1$ and $18_2$ are both fed to a subtraction type adder $45_1$ from which the difference between both the signals is derived. The difference thus provided is supplied to the weighting circuit $10_1$ as the weighting signal. Similarly, the signals respectively memorized in two capacitors $18_i$ and $18_{i+1}$ are supplied to a subtraction type adder $45_i$ and the output therefrom is fed to the weighting circuit $10_i$. The construction of the example shown in FIG. 7 is substantially same as that shown in FIG. 5 except that the difference outputs from the adjacent two of the subtraction type adders $45_1$ to $45_n$ are respectively fed to the weighting circuits $10_1$ to $10_n$ and the differentiation circuit 11 is not used.

Figure 8:
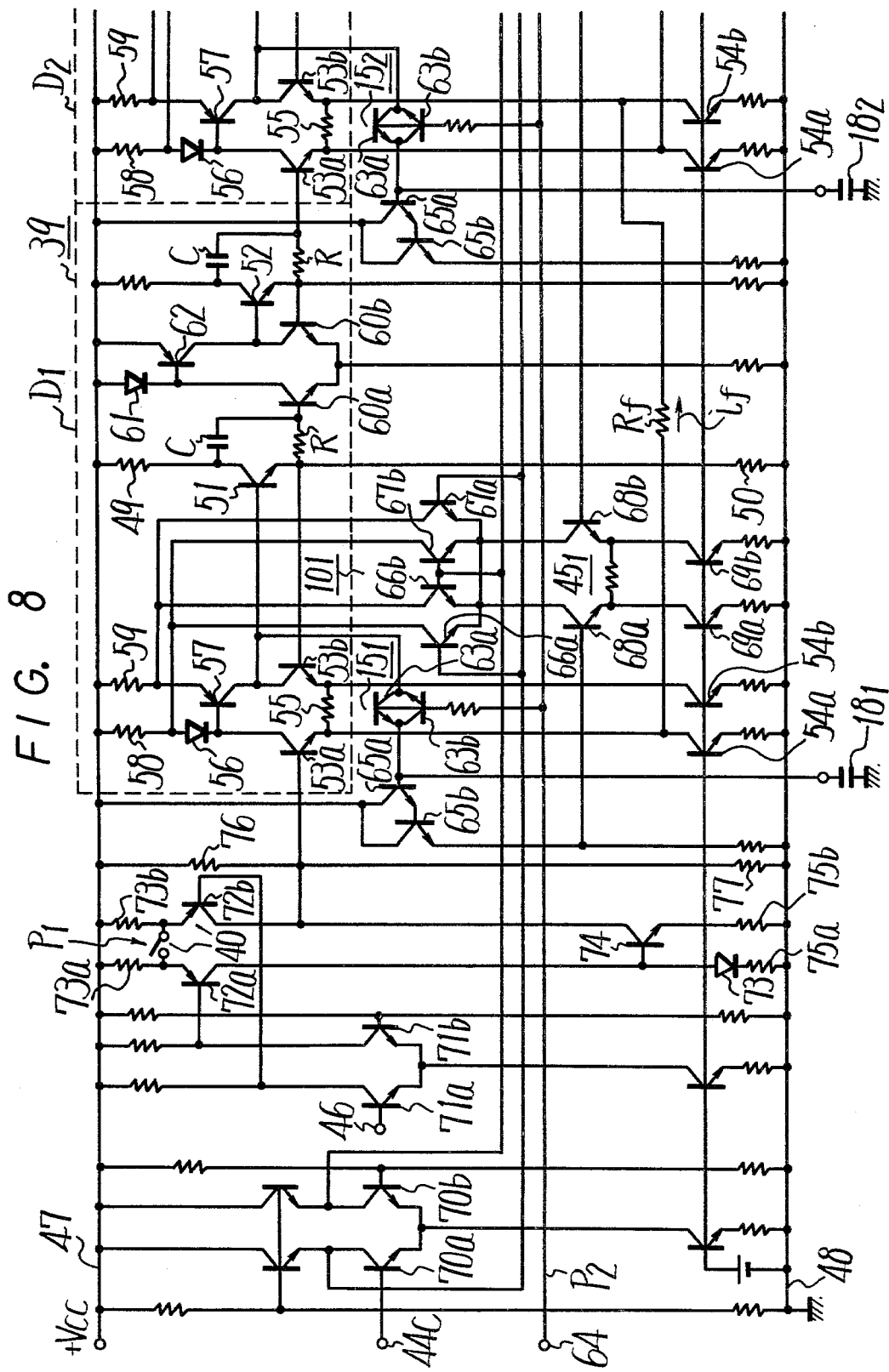
FIG. 8 is a schematic diagram showing an example of the practical connection of a part of FIG. 7.

FIG. 8 shows an example of a practical connection of a part of the example shown in FIG. 7. In this circuit construction, the capacitors $18_1$ to $18_n$ which memorize the weighting signals are provided as external circuit elements, but the other circuit elements are provided on the same semiconductor wafer as IC. The delay circuit 39 consists of the delay units $D_1$ to $D_n$, each being same in construction (In FIG. 8, delay unit $D_1$ and a part of delay unit $D_2$ are only shown). The delay unit $D_1$ is formed of two stages of R-C type phase shifters connected in cascade. A transistor 51 which has the collector connected to a power supply line 47 through a resistor 49 and the emitter connected to an earth line 48 through a resistor 50, forms a phase splitter. The R-C type phase shifter is provided by connecting the collector and emitter of the transistor 51 through a capacitor C and a resistor R. The resistors 49 and 50 are selected equal in resistance value and the voltage gain of the transistor 51 is selected approximately 1. Thus, the collector output signal and emitter output signal of the transistor 51 are opposite in polarity but equal in level. Further, a transistor 52 forms a phase splitter, and a similar R-C type phase shifter is formed by connecting the collector and emitter of the transistor 52 through a capacitor C and a resistor R. A differential amplifier consisting of transistors 53a and 53b is provided at the input side of the phase shifter formed of the transistor 51. A constant current source consisting of transistors 54a and 54b is connected between the respective emitters of transistors 53a, 53b and the earth line 48. The emitters of transistors 53a, 53b are coupled through a resistor 55. A current mirror circuit, consisting of a diode 56, a transistor 57 and resistors 58, 59 each of which has the same resistance value, is provided between the respective collectors of the transistors 53a, 53b and the power supply line 47. The collector of the transistor 53b is connected to the base of the transistor 51. Between two stages of the R-C type phase shifter, provided is a differential amplifier consisting of transistors 60a and 60b, and between the collectors of the transistors 60a, 60b and the power supply line 47 provided is a current mirror circuit consisting of a diode 61 and a transistor 62. The collector of the transistor 60b is connected to the base of the transistor 52.

As described above, by connecting two R-C type phase shifter in cascade, a quadratic delay unit is formed. Further, a positive feed-forward circuit and a negative feedback circuit are connected between the input and output sides of the quadratic delay unit, whereby the decay of the delay time in a high frequency range of the video band is compensated for. In FIG. 8, the signal path including a resistor $R_f$ coupling the emitter of the transistor 53a of the input side differential amplifier to the emitter of a transistor 53b of an input side differential amplifier at the next stage delay unit $D_2$ is used common for both of the feed-forward circuit and feedback circuit.

Now, the above delay unit will be described with reference to FIGS. 9 to 11. The fundamental construction thereof is the quadratic delay unit which is formed by connecting two of the phase shifters i.e. delay circuits, which add the signals opposite in phase through the capacitor and the resistors, in cascade as described above.

Figure 9:
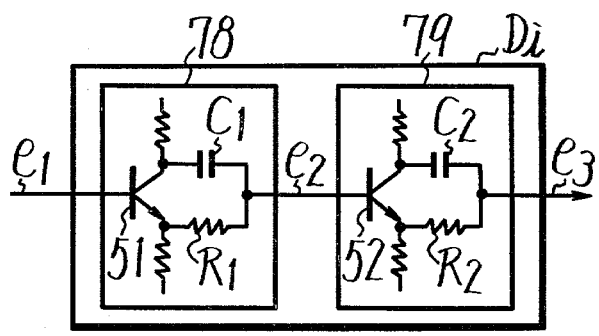
FIGS. 9, 10 and 11 are respectively construction diagrams and frequency characteristic graph used to explain the delay circuit used in the example shown in FIG. 8.

In FIG. 9, 78 and 79 respectively designate phase shifters which are connected in cascade to provide a quadratic delay unit Di. At the collector and emitter of the transistor 51 in the phase shifter 78, generated are signals same in level but opposite in phase. The collector and emitter of the transistor 51 are connected through a capacitor $C_1$ and a resistor $R_1$ and the connection point between the capacitor $C_1$ and resistor $R_1$ is led out as an output terminal of the phase shifter 78. The phase shifter 79 at the next stage is similarly formed of a transistor 52 for phase splitting, a resistor $R_2$ and a capacitor $C_2$. If $S_1 = j\omega C_1 R_1$, the relation between an input voltage $e_1$ to the phase shifter 78 and an output voltage $e_2$ therefrom is expressed as follows:

$$e_2 = \left(\frac{1-S_1}{1+S_1}\right) e_1$$

Accordingly, if $S_2 = j\omega C_2 R_2$, the relation between the input $e_1$ and an output $e_3$ of the delay unit $D_i$ in which the phase shifters 78 and 79 are connected in cascade becomes as follows:

$$e_3 = \left(\frac{1-S_1}{1+S_1}\right)\left(\frac{1-S_2}{1+S_2}\right) e_1 \quad (1)$$

$$= \frac{1 + S_1 S_2 - (S_1 + S_2)}{1 + S_1 S_2 + (S_1 + S_2)} e$$

If $S^2 = S_1 S_2$, the equation (1) can be rewritten as follows:

$$e_3 = \frac{1 + S^2 - mS}{1 + S^2 + mS} e_1 \quad (2)$$

where $$m = \left(\sqrt{\frac{S_1}{S}} - \sqrt{\frac{S}{S_1}}\right)^2 + 2$$

Accordingly, $m \geq 2$. If $R_1 = R_2 = R$, and $C_1 = C_2 = C$, the minimum value of m is 2.

Further, a phase difference $\theta$ between the input and output of the delay unit $D_i$ is expressed as follows:

$$\theta = 2 \tan^{-1} \left| \frac{2mS}{1 + S^2} \right|$$

Thus, the decay of the delay time $$T_d \left( = \frac{\theta}{\omega} \right)$$

of the delay unit $D_i$ becomes large in high frequency range.

In the improved delay circuit, the positive feed-forward circuit and the negative feedback circuit are connected between the input and output terminals of the delay unit $D_i$ shown in FIG. 9 to thereby make m smaller than 2 and to compensate for the frequency characteristic of the delay time in a high frequency range.

That is, the numerator of the equation (2) is varied by the positive feed-forward and the denominator thereof is varied by the negative feedback, respectively.

Figure 10:
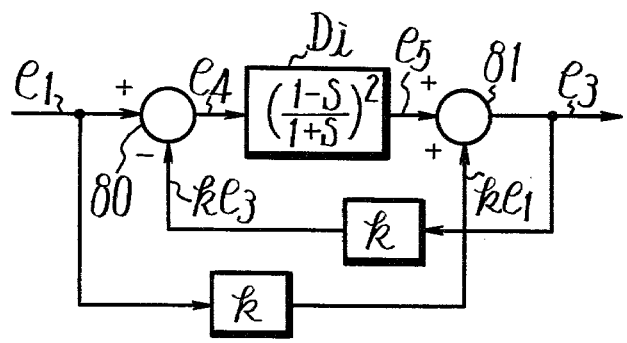

As shown in FIG. 10, adders 80 and 81 are respectively provided at the input and output sides of the delay unit $D_i$ having the input to output relation expressed by the equation (1), the voltage provided by multiplying the output voltage $e_3$ with a function k is negatively fed back to the adder 80, and the voltage provided by multiplying the input voltage $e_1$ with the function k is positively fed forward to the adder 81.

If it is assumed that the output voltage from the adder 80 is taken as $e_4$ and the output voltage from the delay unit $D_1$ as $e_5$, the following equations are obtained.

$$e_4 = e_1 - ke_3 \quad (3)$$

$$e_5 = \left(\frac{1-S}{1+S}\right)^2 e_4 \quad (4)$$

$$e_3 = e_5 + ke_1 \quad (5)$$

$$= \left(\frac{1-S}{1+S}\right)^2 e_4 + ke_1$$

From the equations (3) and (5), the following equation (6) is obtained.

$$e_3 = \left(\frac{1-S}{1+S}\right)^2 (e_1 - ke_3) + ke_1 \quad (6)$$

$$= \left\{\left(\frac{1-S}{1+S}\right)^2 + k\right\} e_1 - \left(\frac{1-S}{1+S}\right)^2 ke_3$$

The above equation (6) can be rewritten as follows:

$$e_3 = \frac{\left(\frac{1-S}{1+S}\right)^2 + k}{\left(\frac{1-S}{1+S}\right)^2 k + 1} e_1 = \frac{(1-S)^2 + k(1+S)^2}{k(1-S)^2 + (1+S)^2} e_1 \quad (7)$$

$$= \frac{(1+k) - 2(1-k)S + (1+k)S^2}{(1+k) + 2(1-k)S + (1+k)S^2} e_1$$

$$= \frac{1 - 2\frac{1-k}{1+k} S + S^2}{1 + 2\frac{1-k}{1+k} S + S^2}$$

As will be apparent from the above equation (7), the corresponding coefficients of the numerator and denominator are selected equal to make $$m = 2\frac{1-k}{1+k}.$$

Thus, if the function k is selected, the value of m can be controlled. In other words, since $$k = \frac{2-m}{2+m},$$

if $m = 1.653$ is desired, $k \approx 0.095$, while if $m = 1.706$ is desired $k \approx 0.079$. Thus, the numerator and the denominator of the equation (7) can be corrected at the same time.

The phase difference $\theta$ between the input and output of the improved delay circuit shown in FIG. 10 becomes as follows:

$$\theta = 2 \tan^{-1} \left| \frac{2\frac{1-k}{1+k} S}{1 + S^2} \right|$$

Figure 11:
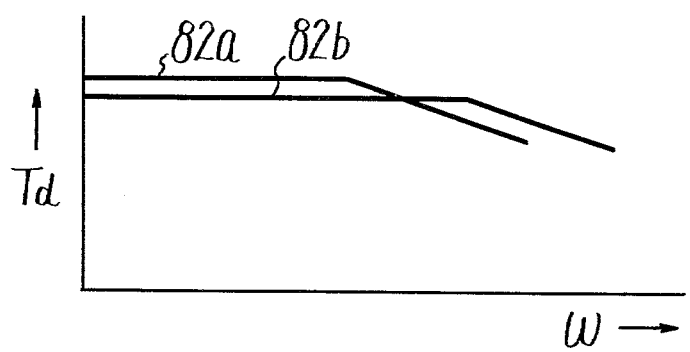

In the case of the delay unit $D_i$ in which no feed-forward and no feedback are applied ($k = 0$) as shown FIG. 9, its frequency characteristic to the delay time $T_d$ becomes as shown by a curve 82a in the graph of FIG. 11, while the frequency characteristic to the delay time $T_d$ of the delay unit $D_i$ shown in FIG. 10 becomes as indicated by a curve 82b in the graph of FIG. 11. As will be clear from the graph of FIG. 11, according to the improved delay unit, although the value of the delay time $T_d$ becomes small the upper limit of the frequency where a predetermined delay time is obtained can be made high by the high frequency compensation.

Turning back to FIG. 8, as described above, in this case the feed-forward circuit and feedback circuit are formed by the signal path including the resistor $R_f$. By way of example, such a case where a current $i_f$ (variation component) is flowed through the resistor $R_f$ in the illustrated direction by the fact that the input voltage is varied in the direction to be increased will be now taken into consideration. In the delay unit $D_2$ at the next stage, the emitters of the transistors 53a and 53b are connected with the constant current source consisting of transistors 54a and 54b, and the currents flowing through the transistors 53a and 53b are made equal by the current mirror circuit consisting of a diode 56 and a transistor 57. Therefore, the current ($i_f/2$) flows through each of the transistors 53a and 53b in the delay unit $D_2$ at the next stage. Since the emitter potential of the transistor 53a is fixed, the emitter potential of the transistor 53b increases in response to the current ($i_f/2$) and, similarly the base potential thereof becomes increased. Thus, the positive feed-forward operation is performed. Similarly, the negative feedback operation is performed. That is, if the current $i_f$ shown in FIG. 8 is generated by the variation of the output voltage (which is the emitter voltage of the transistor 53b in the next stage delay unit $D_2$) in its lowering direction, the current ($i_f/2$) flows through the transistors 53a, 53b of the delay unit $D_1$. Since the base potential and emitter potential of the transistor 53a in the delay unit $D_1$ are fixed in response to the input voltage, the emitter potential and base potential of the transistor 53b increase, whereby the negative feedback operation is performed.

The switching circuits $15_1$ to $15_n$ are each formed of two transistors 63a and 63b of a bidirectional structure and inserted between the collector of the transistor 53b in the input side differential amplifier and each of the capacitors $18_1$ to $18_n$. The gate pulse $P_2$ is supplied through a terminal 64 to the bases of the transistors 63a and 63b. In the period when the gate pulse $P_4$ is in high level, the transistors 63a and 63b both turn ON and the capacitors $18_1$ to $18_n$ are discharged therethrough. The terminal voltages across the capacitors $18_1$ to $18_n$ are derived as the weighting signals through an emitter follower circuit (formed of transistors 65a and 65b) of a high input impedance.

The weighting circuits $10_1$ to $10_n$ are each made as a multiplier of a double balanced type which serve also as the difference circuits $45_1$ to $45_n$. That is, a differential amplifier is formed of transistors 66a and 66b and a differential amplifier is formed of transistors 67a and 67b. The respective emitter connection points of the differential amplifiers are connected with the output terminals of a differential amplifier consisting of transistors 68a and 68b which have the emitters connected to transistors 69a and 69b, respectively, which in turn form a constant current source circuit. Across the base connection point of the transistors 66a, 67a and that of the transistors 66b, 67b, applied is the video signal. The weighting signal derived from the input side of each delay unit and memorized in the capacitor $18_1$ is fed to the base of the transistor 68a, and the weighting signal derived from the output side of each delay unit and memorized in the capacitor $18_2$ is fed to the base of the transistor 68b. Thus, the collector outputs of the transistors 68a, 68b becomes the difference component between the two weighting signals and hence the transistors 68a and 68b correspond to the adder $45_1$ in FIG. 7. The multiplied products of the difference component and the video signals, which are opposite in phase each other, appear at the collector connection point of the transistors 66a, 67b and at that of the transistors 66b, 67a, respectively.

The collector connection point of the transistors 66a, 67b is connected to the connection point of the resistor 58 and the diode 56 at the input side differential amplifier, and the collector connection point of the transistors 66b, 67a is connected to the connection point of the resistor 59 and the emitter of the transistor 57 at the input side differentiaa amplifier. Since the emitter current of the transistors 53a, 53b of the input side differential amplifier. Since the emitter current of the transistors 53a, 53b of the input side differential amplifier is made as a fixed value by the constant current source (transistors 54a, 54b), the weighted signal current flows through the loop including the emitter resistor 55 to thereby generate across the resistor 55 the signal voltage which is applied to the base of the transistor 51.

The video signal is supplied to the weighting circuits $10_1$ to $10_n$ through a differential amplifier consisting of transistors 70a, and 70b. That is, the video signal through the mode selection switch 36 (refer to FIG. 7) is fed to a terminal 44c connected to the base of the transistor 70a.

A differential amplifier is further provided by transistors 71a, 71b. The video signal from the amplifier 37 (refer to FIG. 7) is fed to a terminal 46 connected to the base of the transistor 71a. The collectors of the transistors 71a, 71b are respectively connected to the bases of transistors 72a, 72b. Resistors 73a, 73b are respectively inserted between the emitters of the transistors 72a, 72b and the power supply line 47. The emitters of both transistors 72a, 72b is coupled through a switch 40'. Between the collectors of the transistors 72a, 72b and the earth line 48, inserted is a current mirror circuit which consists of a diode 73, a transistor 73 and resistors 75a, 75b each having the same resistance value. The collector connection point of the transistors 72b, 74 is connected to the base of the transistor 53a in the first stage delay unit $D_1$ of the delay circuit 39 and also to the connection point between resistors 76, 77 which are inserted between the power supply line 47 and the earth line 48.

The transistors 72a, 72b and the switch 40' form an example of the practical construction of the switch 40 in FIG. 7. In this case, the switch 40' is so controlled that it becomes ON in the ghost detecting period $T_0$ in which the control pulse $P_1$ is in high level. When the switch 40' turns ON, the transistors 72a and 72b operate as a differential amplifier and hence the video signal current is supplied to the base of the transistor 53a. This state corresponds to the state that in FIG. 7 the input terminal 40a of the switch 40 is selected. In the period other than the ghost detecting period $T_0$, the switch 40' is rendered OFF. Since the resistors 73a, 73b are an approximate constant current source, there is no signal current loop. Thus, a fixed DC voltage (the bias voltage source 41 in FIG. 7) is applied the base of the transistor 53a.

As described above, in the period other than the ghost detecting period $T_0$, the outputs from the weighting circuits $10_1$ to $10_n$ are fed to the delay circuit 39.

The example of the invention shown in FIGS. 7 and 8, similar to the example of the invention shown in FIG. 5, can present such an advantage that only one common delay circuit is enough. Further, if such a construction that the R-C type phase shifters are connected in cascade is employed as the delay circuit 39, it can be formed as an IC on the semiconductor wafer same as that for the associated circuit elements.

FIG. 12 shows another example of the semiconductor delay circuit which utilizes a BBD (bucket brigade device). In this example, one delay unit $D_i$ is made of transistors 83, 84 and capacitors 85, 86. That is, the transistor 83 has the base connected to a clock supply line 87; the transistor 84 has the collector-emitter path connected in series to that of the transistor 83 and the base connected to a clock supply line 88; the capacitor 85 is connected between the connection point of the collector of the transistor 83 and the emitter of the transistor 84 and clock supply line 87; and the capacitor 86 is connected between the connection point of the emitter of the transistor 83 at the next stage delay unit $D_{i+1}$ and the collector of the transistor 84 and the clock supply line 88.

The transistors 83 and 84 are made ON alternatively by two-phase clock pulse trains fed thereto through the respective lines 87 and 88. When the transistors 83 is made ON, the charge is transferred from the capacitor 85 to the capacitor 86, while when the transistor 84 is in ON-state, the charge is transferred from the capacitor 86 to the capacitor 85. Thus, the video signal is transmitted sequentially in the direction from the delay unit $D_i$ to the next delay unit $D_{i+1}$.

The present invention can be similarly applied to the case where the delay circuit 39 is formed of the BBD as set forth above.

If the BBD is made of bi-polar transistors as shown in FIG. 12, it can be formed on the same semiconductor wafer as an IC on which the associated circuit elements are formed.

While the principles of the invention have been described above in connection with specific embodiments, and particular modifications thereof, it is to be clearly understood that this description is made only by way of example and not as a limitation on the scope of the invention.

We claim as our invention:

1. A ghost cancelling system comprising:
   an input terminal applied with a video signal including a ghost signal component;
   a ghost cancelling circuit connected to said input terminal, said ghost cancelling circuit including a transversal filter; and
   an output terminal connected to said ghost cancelling circuit for deriving an output video signal in which said ghost signal component is substantially suppressed, characterized in that said transversal filter comprises a combination of
   (1) a common delay circuit used for a signal delay circuit and for a demultiplexer circuit in time divisional manner,
   (2) a memory circuit connected to said common delay circuit and activated when said common delay circuit is used for said demultiplexer circuit, and
   (3) a weighting circuit connected between said memory circuit and said common delay circuit.

2. A ghost cancelling system according to claim 1, wherein said transversal filter is an input adding type.

3. A ghost cancelling system according to claim 1, wherein said common delay circuit is formed on a semiconductor wafer as an integrated circuit.

4. A ghost cancelling system according to claim 3, wherein said weighting circuit is also formed on said semiconductor wafer as an integrated circuit.

5. A ghost cancelling system according to claim 4, wherein said common delay circuit has a plurality of delay units each of which is formed as an R-C type phase shifter.

6. A ghost cancelling system according to claim 4, wherein said common delay line is a bucket brigade device.

* * * * *